3,595,735
BLOWN TUBULAR FILMS
Frederick S. Tyrrell, Irvington, N.Y., assignor to National Distillers and Chemical Corporation, New York, N.Y.
No Drawing. Filed May 6, 1968, Ser. No. 727,023
Int. Cl. B29c 19/00; B32b 27/08
U.S. Cl. 161—162　　　　　　　　　　　　　　8 Claims

ABSTRACT OF THE DISCLOSURE

Blown laminated tubular films, involving laminates of ethylene-vinyl acetate copolymer cores and linear polyethylene outer layers bonded thereto. The linear polyethylene layers incorporate nucleating agents. The resulting laminates have desirable optical, physical and mechanical characteristics, and are useful in various polyolefin film applications.

CROSS-REFERENCE TO RELATED APPLICATION

Blown polypropylene tubular films comprising laminates of ethylene-vinyl acetate copolymer cores and propylene polymer outer layers are disclosed and claimed in my copending application Ser. No. 554,985 filed June 3, 1966, now U.S. Pat. No. 3,381,717 granted May 7, 1968.

BACKGROUND OF THE INVENTION

Field of the invention

This invention relates to blown high density, linear polyethylene tubular films, and more particularly to such films constituted of a laminate having optical and mechanical properties superior to those of previously available blown linear polyethylene tubular films.

In the following specification all parts and percentages are given by weight, unless otherwise indicated.

Description of the prior art

In accordance with current practice, blown tubular films are extruded through circular dies, air pressure being employed to expand the extruded film into a continuous tube of any suitable gauge. Segments of such a film may be separated from one another and the ends sealed in bag-making or for other wrapping applications. Unfortunately, the optical and physical properties of previously available linear polyethylene blown tubular films have been such as to prevent substantial practical application of such materials. Thus, blown linear polyethylene films of conventional composition possess relatively poor optical clarity as compared with films of non-linear polyethylene composition and cannot, therefore, be utilized for wrapping applications, in which film transparency is an important criterion. Moreover, blown linear polyethylene films possess various disadvantageous mechanical and physical properties including relatively poor low temperature brittleness characteristics, poor heat seal strengths, and extreme splittiness (tendency of film to split when subject to transverse stress).

It has previously been proposed to improve the optical, mechanical and physical properties of crystallizable thermoplastic polymeric materials by incorporating small amounts of crystallization nucleating agents in such materials (see, for example, U.S. Pat. 2,991,264, and "Crystalline Olefin Polymers," Part I, Raff and Doake, Interscience Publishers (1965), pages 647–676). The use of such nucleating agents in ordinary blown linear polyethylene films does not, however, overcome all of the difficulties noted hereinabove. Thus, such polyethylene films exhibit high splittiness and very low tear strength, even at ordinary ambient temperatures. Similarly, blown films constituted of polyethylene polymer compositions incorporating such nucleating agents exhibit relatively poor strength and weak physical properties.

SUMMARY OF THE INVENTION

It is among the objects of the present invention to provide blown linear polyethylene tubular films having improved optical, mechanical and physical properties.

A particular object of the invention is to provide such a film possessing excellent optical clarity, reduced splittiness, and increased tear strength, low temperature impact strength characteristics and heat sealability, as compared with previously known blown linear polyethylene tubular films.

These and other objects and advantages of the invention are achieved as more fully described hereinafter.

Fundamentally, the blown polyethylene tubular film of the present invention comprises a laminate having a core constituted of an ethylene-vinyl acetate copolymer and a pair of outer layers laminated to such core, each of which layers is constituted of an ethylene polymer in admixture with a nucleating agent in an amount of from about 0.1% to 5.0%, preferably from 0.2% to 2.5%, by weight of the ethylene polymer film composition. It has been found that such laminate possesses excellent optical clarity and markedly improved mechanical strength and physical properties, as compared with conventional blown linear polyethylene films. Moreover, the blown polyethylene laminated films hereof are markedly stronger than corresponding films prepared by conventional extruding operations. Thus, the tear strength and low temperature impact strength of, e.g., blown linear polyethylene laminated films, prepared in accordance with the present invention, are three to four times greater than the corresponding characteristics of homogeneous extruded linear polyethylene films of like composition.

It has previously been proposed to utilize ethylene-vinyl acetate copolymer compositions as binding layers for polyolefins and other films (see, for example, U.S. Pat. 2,543,229). Such material has not, however, previously been utilized in laminates with linear polyethylene layers containing crystallization nucleating agents to improve the characteristics of blown tubular films constituted thereof.

PREFERRED EMBODIMENTS OF THE INVENTION

The ethylene-vinyl acetate core layer of the laminated films hereof may be formed from polymerized mixtures of from about 50% to 90%, preferably from 70% to 85%, ethylene and from about 10% to 50%, preferably from 15% to 30%, vinyl acetate.

The linear polyethylene layers laminated to the opposite faces of the ethylene-vinyl acetate core are desirably constituted of a high density polyethylene having a density of from about 0.940 to 0.960. Either ethylene homopolymer or, alternatively, copolymers of ethylene with up to about 25%, and preferably from about 3% to 25%, of a suitable co-monomer, may be so utilized. Materials which may be thus copolymerized with ethylene in the formation of the external layers of the laminate of the present invention include propylene and butylene.

Crystalization of the linear polyethylene film compositions is effected, as noted above, by the incorporation of a nucleating agent therein. Nucleating agents which may be thus utilized comprise organocarboxylic acid salts, including the metal benzoates, e.g., sodium, potassium, lithium benzoate or aluminum dibenzoate, the alkali metal salts of fused ring aromatic carboxylic acids such as sodium beta-naphthoate, sodium cyclohexanecarboxylate, sodium cycloheptanecarboxylate, sodium succinate, sodium glutarate, sodium caproate, sodium 4-methyl valerate, aluminum phenyl acetate, or sodium cinnamate; or inorganic materials such as methyl silsesquioxane resin. Desirably, the nucleating agent incorporated in the linear polyethylene layers has an average particle size of from 5 to 750 millimicrons.

The linear polyethylene film laminate may be from about 0.5 to 15 mils in thickness, with the ethylene-vinyl acetate core layer having a thickness of from 10% to 80% thereof and each of the polyethylene layers having approximately one-half the remaining thickness. Preferably, the core layer is approximately one-half the total thickness of the laminate with each of the polyethylene outer layers equal to approximately one-quarter of such thickness.

The blown tubular film is prepared by co-extruding the blown tubular film within a circular die and inflating the continuously formed tube by means of air pressure. The air is introduced by conventional means through the center of the die into the extruded film, the air inflating the film like a bubble and expanding its diameter sufficiently to produce the desired final film gauge. The tubular film may thereafter be sliced into single thicknesses or utilized in continuous lengths, as for bag-forming.

Preferred procedures for the manufacture of the blown polyethylene tubular film of the present invention are described below. It should be understood, however, that the following examples are given as illustrative only.

EXAMPLE I

Blown linear polyethylene tubular film

A laminated blown linear polyethylene film having a gauge of 0.85 mil was prepared. The laminate core was constituted of a copolymer prepared from an 85% ethylene-15% vinyl acetate monomeric mixture, the copolymer having a 1.5 melt index and a density of 0.937. An ethylene-vinyl acetate copolymer, commercially available as "Ultrathene UE–630" from the U.S. Industrial Chemicals Co. division of the assignee of the present invention, was utilized as the core constituent. The laminate outer layers were constituted of a linear polyethylene, having slip levels of from 1700 to 3500 parts per million resulting from incorporation of a slip additive therein. A linear polyethylene, commercially available as "Petrothene LB–710" from the U.S. Industrial Chemicals Co. division of the assignee of the present invention and having a density of 0.960 and a melt index of 0.45, was so utilized. Sodium benzoate was incorporated in the polyethylene layers as a nucleating agent in an amount of 0.6% by weight of the polyethylene extruded.

The linear polyethylene was extruded from a circular die of the internal co-extrusion type, the extruder barrel being maintained at a temperature between 400° and 450° F. and under a barrel pressure of approximately 1700 p.s.i. The ethylene-vinyl acetate copolymer film core was similarly co-extruded within the circular die from a second extruder, the barrel of which was maintained at a temperature between 275° and 325° F. and at a pressure of approximately 1600 p.s.i. Air was injected into the tubular film thus extruded, employing a blow-up ratio of approximately 3 to 4, to provide the product blown tubular film. Such film possessed good clarity, high tear strength, and good heat sealability and low temperature impact strength characteristics.

EXAMPLE II

Blown poly(ethylene-butene-1) tubular film

A laminated blown film was co-extruded in the manner described in Example I employing, however, as the ethylene polymer outer strata thereof, a copolymer of ethylene and butene-1 incorporating slip levels of from 1700 to 3500 p.p.m. slip additive. A copolymer material commercially available as "Petrothene LB–733" from the U.S. Industrial Chemicals Co. division of the assignee of the present invention was so utilized; such copolymer had a density of 0.952 and a melt index of 0.23.

The film thus produced possessed good clarity, high tear strength, and good heat sealability and low temperature impact strength characteristics.

It will be noted that, in accordance with the present invention, a blown linear polyethylene tubular film has been provided having improved optical, physical and mechanical characteristics, as compared with previously known blown linear polyethylene tubular films. Since various changes may be made in the preferred embodiments of such films described hereinabove without departing from the scope of the present invention, it should be understood that the preceding description is illustrative only and should not be construed in a limiting sense.

I claim:

1. A blown linear polyethylene tubular film, comprising a laminate having a core constituted of an ethylene-vinyl acetate copolymer, and a pair of outer layers laminated to said core, each of said layers constituted of a linear polyethylene polymer in admixture with a nucleating agent in an amount of from 0.1% to 5.0% by weight thereof.

2. The blown linear polyethylene tubular film of claim 1, wherein said nucleating agent is para-tertiary butyl benzoic acid, aluminum dibenzoate, potassium, sodium or lithium benzoate, sodium beta-naphthoate, sodium cyclohexanecarboxylate, sodium cycloheptanecarboxylate, sodium succinate, sodium glutarate, sodium caproate, sodium 4-methyl valerate, aluminum phenyl acetate, sodium cinnamate or methyl silsesquioxane resin.

3. The blown linear polyethylene tubular film of claim 1, wherein said nucleating agent consists essentially of sodium benzoate having an average particle size of from 5 to 750 millimicrons.

4. The blown linear polyethylene tubular film of claim 1, wherein the ethylene polymer is a high density polyethylene homopolymer having a density range of from 0.940 to 0.960.

5 The bown linear polyethylene tubular film of claim 1, wherein the ethylene polymer is a copolymer of ethylene with propylene or butylene, the ethylene constituting from 75% to 97% by weight of the monomeric constituents of said copolymer.

6. The blown linear polyethylene tubular film of claim 1, wherein ethylene consitutes from 50% to 90% by weight of the ethylene-vinyl acetate monomeric constituents of the ethylene-vinyl acetate copolymer core of said laminate.

7. The blown linear polyethylene tubular film of claim 1, wherein said laminate has a thickness of from 0.5 to 15 mils and in which each of the ethylene polymer outer layers of said laminate has a thickness equal to from 10% to 45% of the overall thickness thereof.

8. The blown linear polyethylene lubular film of claim 1, wherein said laminate has a thickness of from 0.5 to 15 mils and incorporates a core constituted of an ethylene-vinyl acetate copolymer, ethylene constituting from 70% to 80% by weight of the monomeric constituents of said copolymer; and a pair of outer layers laminated to said core, each of said layers having a thickness of from 10% to 45% of the overall thickness of the laminate and being constituted of a copolymer of ethylene and butylene, in admixture with from 0.1% to 5.0% by weight of a sodium benzoate nucleating agent.

References Cited

UNITED STATES PATENTS

| | | | |
|---|---|---|---|
| 2,543,229 | 2/1951 | Chapman | 161—254X |
| 2,932,323 | 4/1960 | Aries | 161—252X |
| 3,207,737 | 9/1965 | Wales | 260—93.7 |
| 3,207,738 | 9/1965 | Wija | 260—93.7 |
| 3,367,926 | 2/1968 | Voeks | 260—93.7X |
| 3,381,717 | 5/1968 | Tyrrell | 161—252X |
| 3,467,565 | 9/1969 | Utz | 156—244 |
| 3,408,341 | 10/1968 | Joyner et al. | 260—93.7 |
| 3,458,604 | 7/1969 | Palmer | 260—93.7 |

FOREIGN PATENTS

| | | | |
|---|---|---|---|
| 589,517 | 12/1959 | Canada | 156—244 |

JOHN T. GOOLKASIAN, Primary Examiner

C. B. COSBY, Assistant Examiner

U.S. Cl. X.R.

156—144; 161—165, 254, 256; 260—93.7